(12) United States Patent
Stoltz et al.

(10) Patent No.: US 10,748,404 B2
(45) Date of Patent: Aug. 18, 2020

(54) METHOD AND APPARATUS FOR RECOGNISING MICROSLEEP IN A DRIVER OF A VEHICLE

(71) Applicant: Robert Bosch GmbH, Stuttgart (DE)

(72) Inventors: Achim Stoltz, Heilbronn (DE); Felix Wulf, Ludwigsburg (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 15/533,219

(22) PCT Filed: Dec. 3, 2015

(86) PCT No.: PCT/EP2015/078450
§ 371 (c)(1),
(2) Date: Jun. 5, 2017

(87) PCT Pub. No.: WO2016/116201
PCT Pub. Date: Jul. 28, 2016

(65) Prior Publication Data
US 2017/0345276 A1 Nov. 30, 2017

(30) Foreign Application Priority Data
Jan. 19, 2015 (DE) .................... 10 2015 200 697

(51) Int. Cl.
*G08B 21/06* (2006.01)
*G06K 9/00* (2006.01)

(52) U.S. Cl.
CPC ........... *G08B 21/06* (2013.01); *G06K 9/0061* (2013.01); *G06K 9/00845* (2013.01)

(58) Field of Classification Search
CPC .. G08B 21/06; G06K 9/0061; G06K 9/00845; B60W 30/0956; B60W 10/30;
(Continued)

(56) References Cited

U.S. PATENT DOCUMENTS

| 6,070,098 A * | 5/2000 | Moore-Ede .......... | A61B 5/1103 600/300 |
| 6,511,424 B1 * | 1/2003 | Moore-Ede .......... | A61B 5/1103 600/300 |

(Continued)

FOREIGN PATENT DOCUMENTS

| CN | 202257856 U | 5/2012 |
| JP | 2008210285 A | 9/2008 |

(Continued)

OTHER PUBLICATIONS

International Search Report dated Dec. 3, 2015 and Written Opinion, of the corresponding International Application PCT/EP2015/078450 filed Jan. 19, 2015.

*Primary Examiner* — Hai Phan
*Assistant Examiner* — Anthony D Afrifa-Kyei
(74) *Attorney, Agent, or Firm* — Norton Rose Fulbright US LLP; Gerard Messina

(57) ABSTRACT

A method for recognizing microsleep on the part of a driver of a vehicle. The method includes at least a step of reading in an eye closure information item regarding an eye parameter of the driver, the eye closure information item representing a first eyelid position for a maximum eye opening level, and/or a second eyelid position for a minimum eye opening level, for the driver; a step of classifying a current eyelid position of an eyelid of the driver using the eye closure information item, in order to obtain an eye opening information item that represents an open state of the eyes or a closed state of the eyes; and a step of ascertaining a sleep recognition value that represents an indication of an occurrence of microsleep.

13 Claims, 4 Drawing Sheets

(58) Field of Classification Search
 CPC ...... B60W 30/12; B60W 40/04; B60W 40/08;
  B60W 30/09; B60W 10/18; B60W 50/14;
  G06F 3/013
 USPC ............... 340/575; 600/544, 588; 348/78
 See application file for complete search history.

(56) References Cited

U.S. PATENT DOCUMENTS

| | | | |
|---|---|---|---|
| 7,293,550 | B2 | 11/2007 | Beardmore |
| 2004/0070509 | A1* | 4/2004 | Grace ............... A61B 5/18 340/575 |
| 2006/0204041 | A1 | 9/2006 | Hammoud et al. |
| 2008/0101659 | A1 | 5/2008 | Hammoud et al. |
| 2009/0299209 | A1* | 12/2009 | Farbos ............ A61B 5/1103 600/544 |
| 2011/0205350 | A1 | 8/2011 | Terashima et al. |
| 2012/0002843 | A1 | 1/2012 | Yoda et al. |
| 2013/0076885 | A1 | 3/2013 | Kobetski et al. |
| 2015/0025917 | A1* | 1/2015 | Stempora ............ G06K 9/0061 705/4 |
| 2017/0060235 | A1* | 3/2017 | Banyay ............... G06F 3/013 |
| 2017/0080947 | A1* | 3/2017 | Boos ................ A61B 5/6893 |
| 2017/0143253 | A1* | 5/2017 | Krenzer ............ A61B 5/1103 |
| 2017/0247031 | A1* | 8/2017 | Feit ................. B60W 30/12 |

FOREIGN PATENT DOCUMENTS

| | | |
|---|---|---|
| JP | 2010224827 A | 10/2010 |
| JP | 2011048531 A | 3/2011 |
| JP | 2011086186 A | 4/2011 |
| JP | 2012084068 A | 4/2012 |
| JP | 2012085691 A | 5/2012 |
| JP | 2013257691 A | 12/2013 |
| JP | 2014057826 A | 4/2014 |
| JP | 2014123287 A | 7/2014 |

* cited by examiner

METHOD AND APPARATUS FOR RECOGNISING MICROSLEEP IN A DRIVER OF A VEHICLE

FIELD

The present invention relates to a method for recognizing microsleep on the part of a driver of a vehicle, to a corresponding apparatus, and to a corresponding computer program.

BACKGROUND INFORMATION

Drowsiness and microsleep at the wheel often result in dangerous situations or accidents. Present-day microsleep detectors output a warning if the driver exceeds a certain drowsiness threshold. The warning can be given optically, for example by way of a displayed coffee cup, or acoustically. This warning can be ignored by the driver, however.

Present-day drowsiness assistance systems estimate the sleep susceptibility of the driver only indirectly from his or her driving behavior. A driving profile is created from the steering behavior of the driver, and is compared with the current driving behavior over a longer journey. If there is no change in the steering angle for a long time and then an abrupt steering input, this is then recorded as a "deadband event" (DBE). If these deadband events accumulate, the driver is classified as drowsy.

Systems that can recognize the instantaneous degree of opening of the eyes (e.g., SmartEye, Facelab, etc.) based on data of a video camera are also known. Conventional systems that can recognize the identity of a person based on video signals are also available.

U.S. Patent Appl. Pub. No. US 2011/205350 A1 describes an eyes-open or eyes-closed detection device, an eye-opening-degree estimation device and a program.

U.S. Patent Appl. Pub. No. US 2013/0073885 A1 describes an eye-closure detection device, which used a structured illumination.

SUMMARY

In accordance with the present invention, an example method is provided for recognizing microsleep on the part of a driver of a vehicle, furthermore an apparatus that uses that method, and lastly a corresponding computer program, according to the main claims. Advantageous embodiments are described herein.

Microsleep can be recognized with the aid of video-based driver observation and lid opening detection, and a warning can be outputted even before microsleep occurs or begins.

A method for recognizing microsleep on the part of a driver of a vehicle is presented, the method having the following steps:

reading in an eye closure information item regarding an eye parameter of the driver, the eye closure information item representing a first eyelid position for a maximum eye opening level, and/or a second eyelid position for a minimum eye opening level, for the driver;

classifying a current eyelid position of an eyelid of the driver using the eye closure information item, in order to obtain an eye opening information item that represents an open state of the eyes or a closed state of the eyes; and ascertaining a sleep recognition value that represents an indication of an occurrence of microsleep, the sleep recognition value being ascertained using the current eyelid position and/or the eye opening information item, microsleep being recognized if the sleep recognition value exceeds a threshold value at least during a predetermined time period.

An example method for recognizing microsleep on the part of a driver of a vehicle is also presented, the method having the following steps:

reading in an eye movement information item regarding an eye parameter of the driver and/or an eye closure information item regarding an eye parameter of the driver, the eye movement information item representing an information item regarding an eye movement of the eyes of the driver, and/or the eye closure information item representing a first eyelid position for a maximum eye opening level, and/or a second eyelid position for a minimum eye opening level, for the driver; and ascertaining a sleep recognition value that represents an indication of an occurrence of microsleep, the sleep recognition value being ascertained using an eye opening speed derived from the eye movement information item and/or a gaze direction of the driver derived from the eye movement information item and/or information items derived therefrom, microsleep being recognized if the sleep recognition value exceeds a threshold value at least during a predetermined time period.

"Microsleep" can refer in this context, in particular, to unintentional dozing off for several seconds (for example, with eyes closed to a specific degree). An eye closure information item can describe an eye opening or a distance of an upper eyelid of a driver's eye from a lower eyelid of the eye. An "eye movement information item" can also be understood as an eye closure information item. The eye closure information item can encompass: a value of a maximum distance, in particular with eyes open, or of a maximum eye opening level; and a further value of a minimum distance, in particular with eyes closed, or of a minimum eye opening level. The "eye parameter" can thus be understood as a distance between the upper lid and the lower lid of a driver's eye. A current eyelid position that describes an instantaneous eye opening level, for example as a percentage, using the eye closure information item, can then be evaluated and thus classified. In the classifying step an, in particular binary, distinction can thus be made between an open and a closed eye. The sleep recognition value can represent an indication or a probability of a sleep attack or unintentional dozing off, in which context a threshold value for a warning can be or become defined. For example, for a sleep recognition value of more than 50% or more than 75%, a microsleep event or imminent microsleep, or an excessive risk of microsleep, can be recognized. The limit value or threshold value can be selected depending on the risk potential, for example can be between 10% and 99%. The sleep recognition value can be evaluated during a time period of, for example, 0.5 second, 1 second, 30 seconds, or one minute. The signals or values can thus be evaluated during the time period. The time period can be or become adapted to a predefined robustness and a predefined rapidity of the method.

Also provided is an example method for recognizing microsleep on the part of a driver of a vehicle, which method has all the steps of the preceding variants of the method presented here.

Before the reading-in step the driver can be identified in an identifying step. In the reading-in step or alternatively in the identifying step, the eye closure information item can be furnished or read in, in particular from a database, using an information item regarding the identified driver. The driver can thus be recognized in video-based fashion, or on the basis of his or her vehicle key or based on an inputted identification key. Advantageously, the method can thereby recognize microsleep more quickly.

Before the reading-in step, in an evaluating step the current eyelid position can be evaluated over an initialization time span in order to determine the eye closure information item. The initialization time span can last, for example, at least one minute. Alternatively, the initialization time span can be equal to five minutes. The initialization time span can thus have a duration of between 15 seconds and ten minutes. The method can thus be executed for any driver with no prior knowledge.

The classifying step can be preceded by a learning step. In the classifying step the eye closure information item can be adapted using the current eyelid position. In particular, the maximum eye opening level can be adapted. Advantageously, a current eye opening level can thereby also be better determined.

In the classifying step the eye opening information item can be classified using a gaze direction signal, in order to distinguish between open eyes and closed eyes. If a gaze direction signal is not present, closed eyes can be inferred with a probability. The gaze direction signal can represent a gaze direction. A time course of the gaze direction can be used in the classifying step in order to recognize closed eyes.

In the ascertaining step the sleep recognition value can be ascertained using a number of eye opening information items, representing closed eyes, for the driver during the time period, and/or a duration of an eye opening information item, representing closed eyes, during the time period.

In the ascertaining step the sleep recognition value can be ascertained using a lid closure dynamics and/or a lid closure acceleration. An absolute lid closure acceleration, or a lid closure acceleration of the acceleration can be used. The lid closure acceleration represents a value that represents an acceleration of the driver's eyelid. Advantageously, a slow eye closure can be recognized. A risk of microsleep can thus, for example, be recognized promptly. The lid closure acceleration can be evaluated, for example, in a time period of less than or equal to half a second.

The present invention furthermore provides an apparatus that is embodied to carry out, activate, or implement, in corresponding devices, the steps of a variant of a method presented here. The object of the present invention may be achieved quickly and efficiently with this variant embodiment of the present invention in the form of an apparatus.

An "apparatus" can be understood in the present case as an electrical device that processes sensor signals and, as a function thereof, outputs control signals and/or data signals. The apparatus can have an interface that can be embodied in hardware- and/or software-based fashion. With a hardware-based embodiment, the interfaces can be, for example, part of a so-called "system ASIC" that contains a wide variety of functions of the apparatus. It is also possible, however, for the interfaces to be separate integrated circuits or to be made up at least in part of discrete components. With a software-based embodiment, the interfaces can be software modules that are present, for example, on a microcontroller alongside other software modules.

Also advantageous is a computer program product or computer program having program code that can be stored on a machine-readable medium or memory medium such as a semiconductor memory, a hard drive memory, or an optical memory, and can be used to carry out, implement, and/or activate the steps of the method in accordance with one of the embodiments described above, in particular when the program product or program is executed on a computer or an apparatus.

The approach presented here is explained in further detail below, by way of example, with reference to the figures.

DETAILED DESCRIPTION OF EXAMPLE EMBODIMENTS

Figure 1:
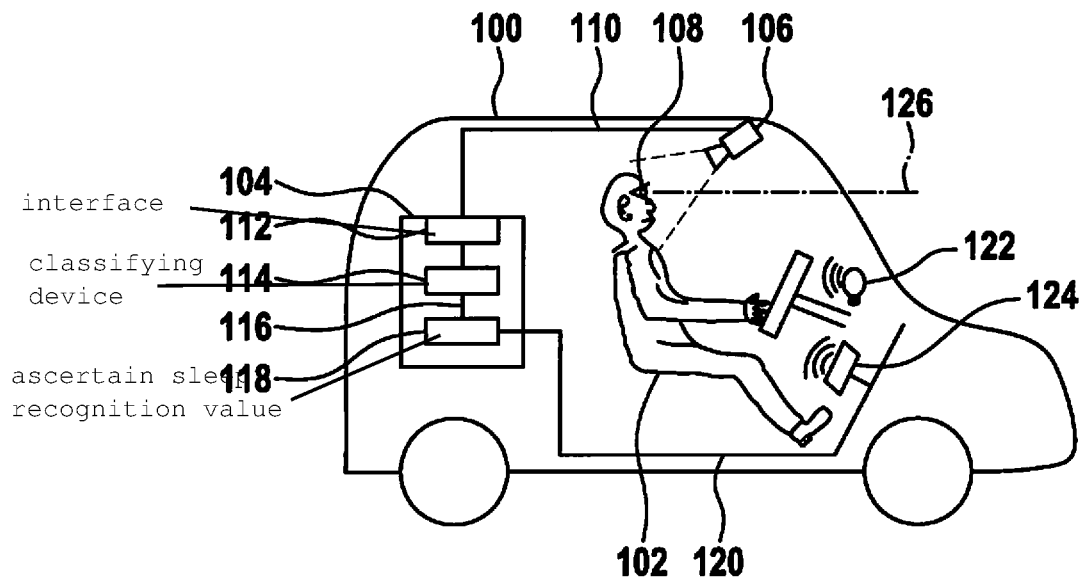
FIG. 1 schematically depicts a vehicle having a driver and an apparatus in accordance with an exemplifying embodiment of the present invention.

In the description below of favorable exemplifying embodiments of the present invention, identical or similar reference characters are used for the elements that are depicted in the various Figures and function similarly, repeated description of those elements being omitted.

FIG. 1 schematically depicts a vehicle 100 having a driver 102 and an apparatus 104 in accordance with an exemplifying embodiment of the present invention. An eye parameter detection device 106 disposed in the front region of vehicle 100 is embodied to detect both eyes 108 of driver 102 and to furnish an eye closure information item 110. Eye closure information item 110 represents a first eyelid position for a maximum eye opening level, and a second eyelid position for a minimum eye opening level, for driver 102.

Apparatus 104 for recognizing microsleep on the part of driver 102 has an interface 112 for reading in eye closure information item 110 regarding at least one eye parameter of driver 102. A classifying device 114 is embodied to classify a current eyelid position of an eyelid of driver 102 using eye closure information item 110, in order to obtain an eye opening information item 116 that represents in binary fashion an open state of the eyes or a closed state of the eyes, or distinguishes between the two aforesaid states.

Apparatus 104 furthermore has a device 118 for ascertaining a sleep recognition value 120. Sleep recognition value 120 represents an indication of an occurrence of microsleep, sleep recognition value 120 being ascertained using the current eyelid position and/or eye opening information item 116 and an eye opening speed and/or a gaze direction 126 of driver 102, and/or information items derived therefrom. Microsleep is recognized if sleep recognition value 120 exceeds a threshold value at least during a predetermined time period.

Vehicle 100 has an optical warning device 122 as well as an acoustic warning device 124, which are embodied to indicate, respectively optically and acoustically, a danger due to a high risk of a microsleep event, or a microsleep event, for driver 102.

In exemplifying embodiments, eye parameter detection device 106 is embodied to detect a current eyelid position, a speed of an eyelid upon eye opening, an acceleration of the eyelid upon eye opening, and/or the current gaze direction 126 of driver 102, and to derive information items therefrom, such as an instantaneous eye opening, i.e. a distance between upper and lower eyelid, a first eyelid position for a maximum eye opening level, and a second eyelid position for a minimum eye opening level, for driver 102, or an instantaneous eye opening level. The information items listed here can be represented by eye closure information item 110, or can be furnished as separate signals or information items and read in via interface 112. Eye parameter detection device 106 is thus also referred to as "eye closure preprocessing" or ECP.

Figure 2:
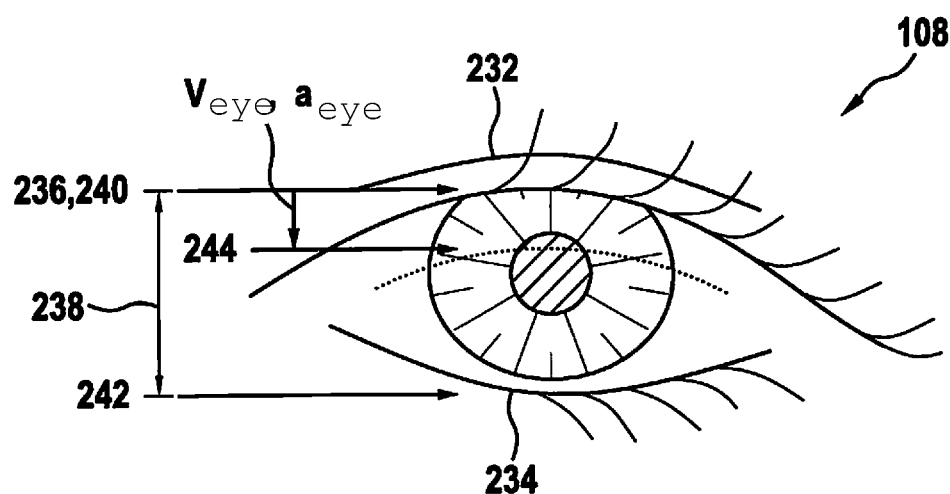
FIG. 2 is a simplified depiction of a driver's eye.

FIG. 2 is a simplified depiction of an eye 108 of a driver. The driver can be driver 102 described in FIG. 1. The eye has an upper eyelid 232 and a lower eyelid 234. A distance 238 between upper eyelid 232 and lower eyelid 234 can be determined from position 236 of the eyelids, in particular in relation to one another. If position 236 of eyelids 232, 234 or distance 238 of eyelids 232, 234 is determined over a long period of time, for example five minutes, a first eyelid position 240 for a maximum eye opening level, and a second eyelid position 242 for a minimum eye opening level, can be determined for eye 108.

In the depiction of FIG. 2, for simplicity's sake first eyelid position 240 corresponds to the depicted position 236 of upper eyelid 232. A dashed line through the pupil of eye 108 shows a current eyelid position 244. Eyelid 232 moves at an eye opening speed $V_{eye}$, and accelerates with a lid closure acceleration $a_{eye}$.

Figure 3:
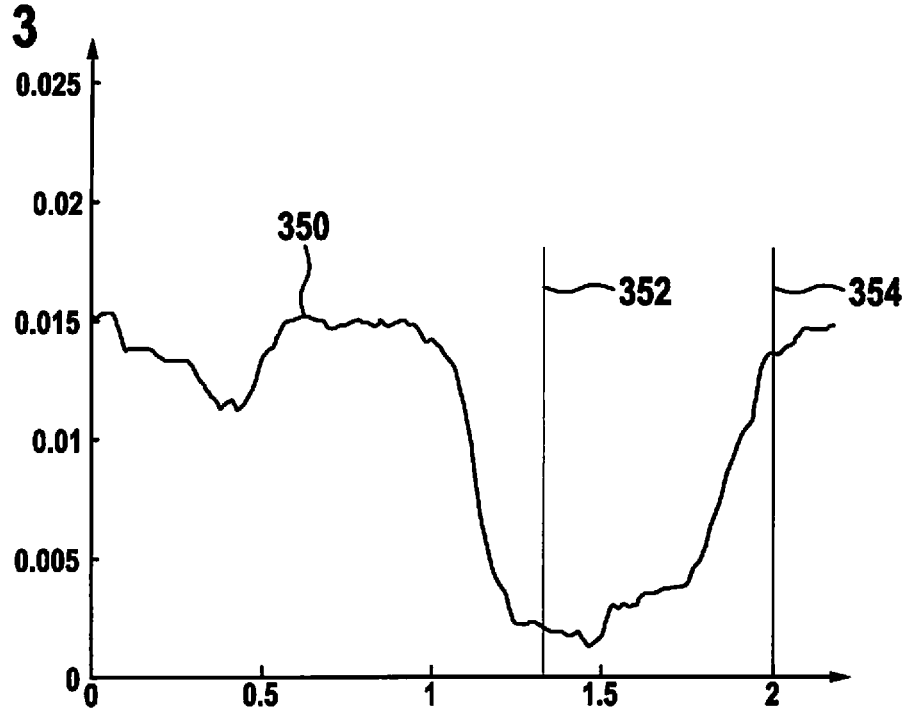
FIG. 3 is a simplified depiction of an eye closure signal in accordance with an exemplifying embodiment of the present invention.

FIG. 3 is a simplified depiction of an eye closure signal 350 in accordance with an exemplifying embodiment of the present invention. In a Cartesian coordinate system, a time in seconds is plotted on the abscissa, and a distance in meters between the upper eyelid and the lower eyelid is plotted on the ordinate. The distance can be distance 238, depicted in FIG. 2, between upper eyelid 232 and lower eyelid 234 of an eye of a driver depicted in FIG. 1. Eye closure signal 350 thus shows an eye opening, or a distance between the eyelids, over time. A first vertical line 352 shows the beginning of a microsleep event; a further vertical line 354 shows an end of the microsleep event. The duration of the microsleep event depicted in the exemplifying embodiment shown here is 0.6667 second.

Eye closure signal 350 depicted in FIG. 3 represents an example of an eye closure signal in the context of a microsleep event.

Figure 4:
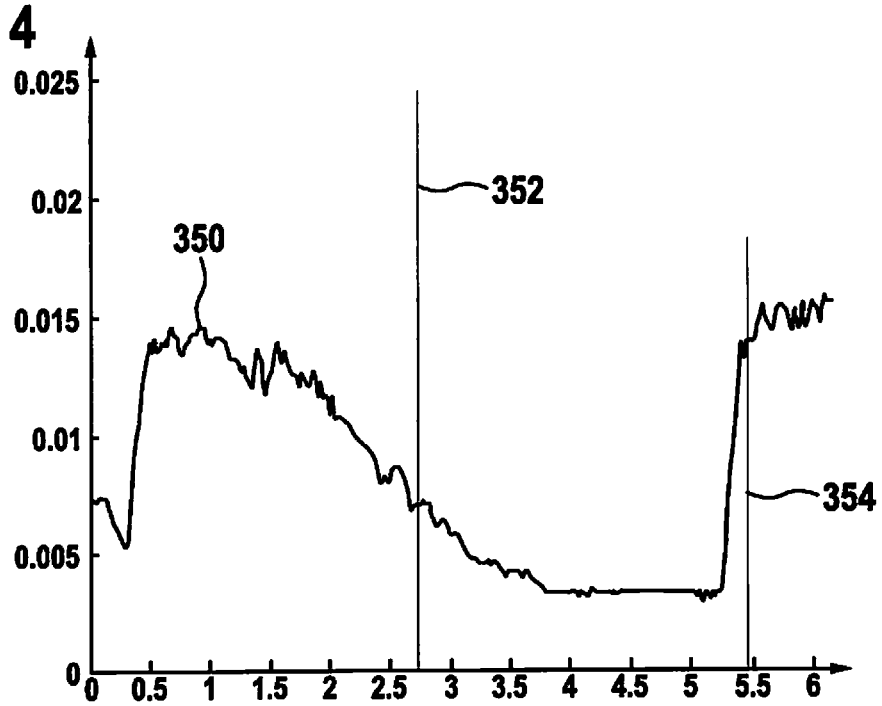
FIG. 4 is a simplified depiction of an eye closure signal in accordance with an exemplifying embodiment of the present invention.

FIG. 4 is a simplified depiction of an eye closure signal 350 in accordance with an exemplifying embodiment of the present invention. As in FIG. 3, in a Cartesian coordinate system a time in seconds is plotted on the abscissa, and a distance in meters between the upper eyelid and the lower eyelid is plotted on the ordinate. Eye closure signal 350 depicted in FIG. 4 represents an example of an eye closure signal 350 in the context of a slow eye closure. A first vertical line 352 shows the beginning of a microsleep event; a further vertical line 354 shows an end of the microsleep event. The duration of the microsleep event depicted in the exemplifying embodiment shown here is 2.7333 second.

Figure 5:
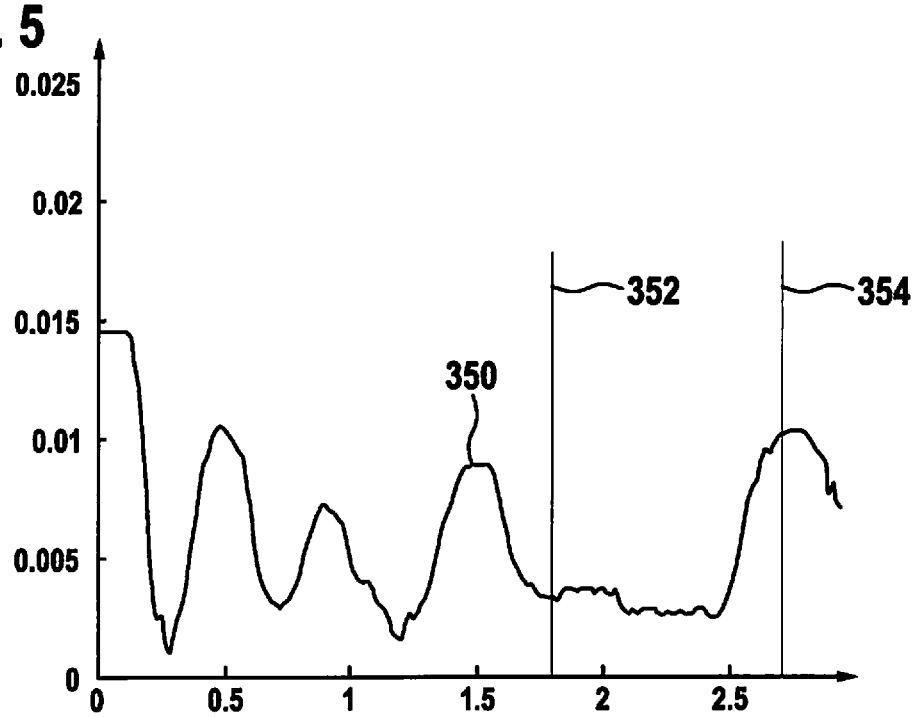
FIG. 5 is a simplified depiction of an eye closure signal in accordance with an exemplifying embodiment of the present invention.

FIG. 5 is a simplified depiction of an eye closure signal 350 in accordance with an exemplifying embodiment of the present invention. As in FIGS. 3 and 4, in a Cartesian coordinate system a time in seconds is plotted on the abscissa, and a distance in meters between the upper eyelid and the lower eyelid is plotted on the ordinate. Eye closure signal 350 depicted in FIG. 5 represents an example of an eye closure signal 350 in the context of an effort to "fight off" sleep. A first vertical line 352 shows the beginning of a microsleep event; a further vertical line 354 shows an end of the microsleep event. The duration of the microsleep event depicted in the exemplifying embodiment shown here is 0.9 second.

Figure 6:
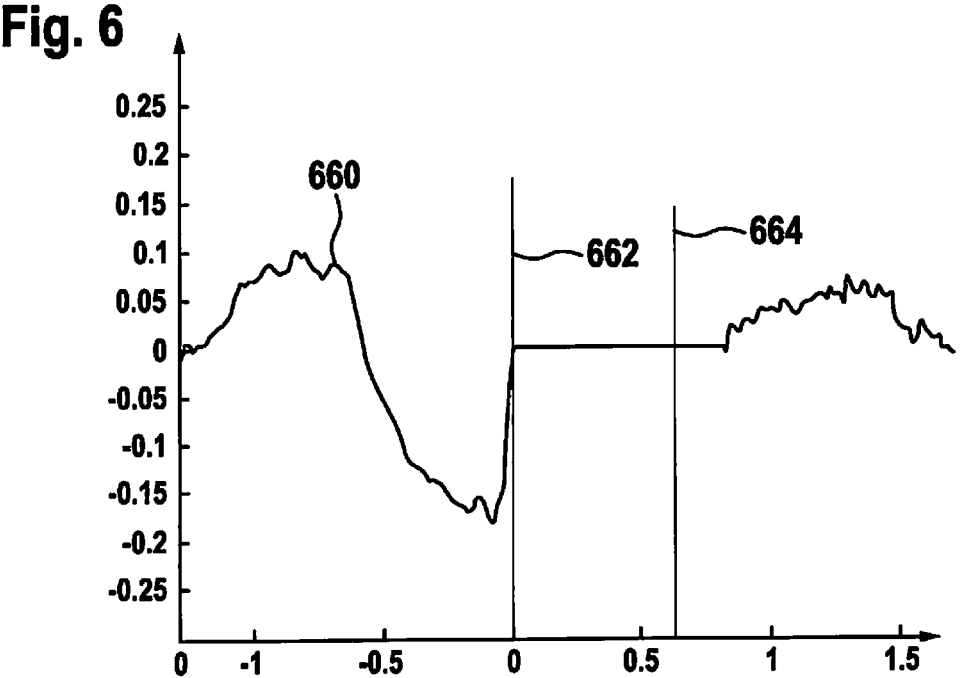
FIG. 6 is a simplified depiction of a gaze direction signal in accordance with an exemplifying embodiment of the present invention.

FIG. 6 is a simplified depiction of a gaze direction signal 660 in accordance with an exemplifying embodiment of the present invention. In a Cartesian coordinate system, a time in seconds is plotted on the abscissa, and a gaze direction on the ordinate. Gaze direction 660 depicted in the Cartesian coordinate system therefore shows a gaze direction over time. The two vertical lines 662, 664 highlight a time interval—from 0 to 0.6 seconds on the abscissa—in which an example of horizontally drifting pupils is evident. The gaze direction does not change during the time period.

Figure 7:
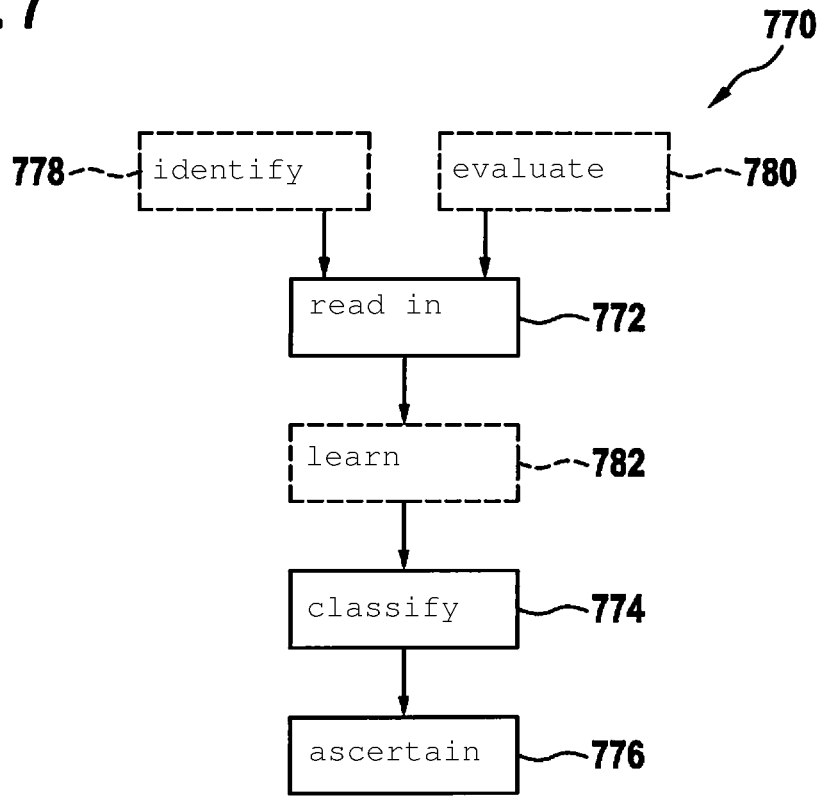
FIG. 7 is a flow chart of a method in accordance with an exemplifying embodiment of the present invention.

FIG. 7 is a flow chart of a method 770 in accordance with an exemplifying embodiment of the present invention. The method can be executed, for example, on apparatus 104 depicted in FIG. 1. Method 770 for recognizing microsleep on the part of a driver of a vehicle encompasses at least a reading-in step 772, a classifying step 774, and an ascertaining step 776. In reading-in step 772, an eye closure information item regarding an eye parameter of the driver is read in. The eye closure information item represents a first eyelid position for a maximum eye opening level, and a second eyelid position for a minimum eye opening level, for the driver. The result is that, so to speak, the two end positions for the driver's eyelid are defined, and a current eyelid position of the eyelid can be determined relative thereto and represented as an eye opening level. A value that is comparable between two persons or drivers is thus presented.

In classifying step 774, the current eyelid position is classified using the eye closure information item in order to obtain an eye opening information item that represents an open state of the eyes or a closed state of the eyes. In an exemplifying embodiment, an eye opening level is determined using the current eyelid position and the eye closure information item, and that level is compared with a threshold value. The threshold value varies in different exemplifying embodiments. For example, a closed state of the eyes is defined at an eye opening level of less than 50%. The threshold value can be between 0 and 70%. Advantageously, a threshold value is lower than 50%, or in particular lower than 30%.

In ascertaining step 776, a sleep recognition value is ascertained. The sleep recognition value represents an indication or a probability of an occurrence of microsleep. In an exemplifying embodiment, the sleep recognition value is ascertained using the current eyelid position or using the current eye opening level. The sleep recognition value can be determined using a gaze direction of the driver or an eye opening speed. In order to improve the robustness of the sleep recognition value, at least two of the aforesaid information items or signals are used in order to ascertain the sleep recognition value.

In an exemplifying embodiment, the method has an optional identifying step 778. In the identifying step, the driver is identified. This can be accomplished optically via image capture and image recognition. Alternatively, the driver is identified via a fingerprint, an iris scan, input of a code, or via a personal key or the like. The eye closure information item is then furnished using an information item regarding the identified driver, or read in from a database in step 772 using the information item regarding the identified driver.

In an exemplifying embodiment method 770 has, prior to reading-in step 772, an optional evaluating step 780 in which the current eyelid position is evaluated over a predetermined time span in order to determine the eye closure information item.

In a particular exemplifying embodiment the method has an optional step 782 a learning step 782 between reading-in step 772 and classifying step 774. In learning step 782, the eye closure information item is adapted using the current eyelid position. It is thereby possible to raise the maximum eye opening level if the current eyelid position represents a larger eye opening than the maximum eye opening level. The same applies analogously to the minimum eye opening level.

Optionally, in classifying step 774 the eye opening information item is classified using a gaze direction signal in order to distinguish between open eyes and closed eyes. If a gaze direction signal is not present, this can indicate closed eyes. In ascertaining step 776 the sleep recognition value can be ascertained using an information item regarding the number of closings, or of changes between the state of open eyes and the state of closed eyes. A predetermined number of eye-closing operations within a predetermined time interval can thus indicate a microsleep event. In addition, in an exemplifying embodiment the sleep recognition value can optionally be ascertained using a lid closing dynamics or a lid closing acceleration.

Figure 8:
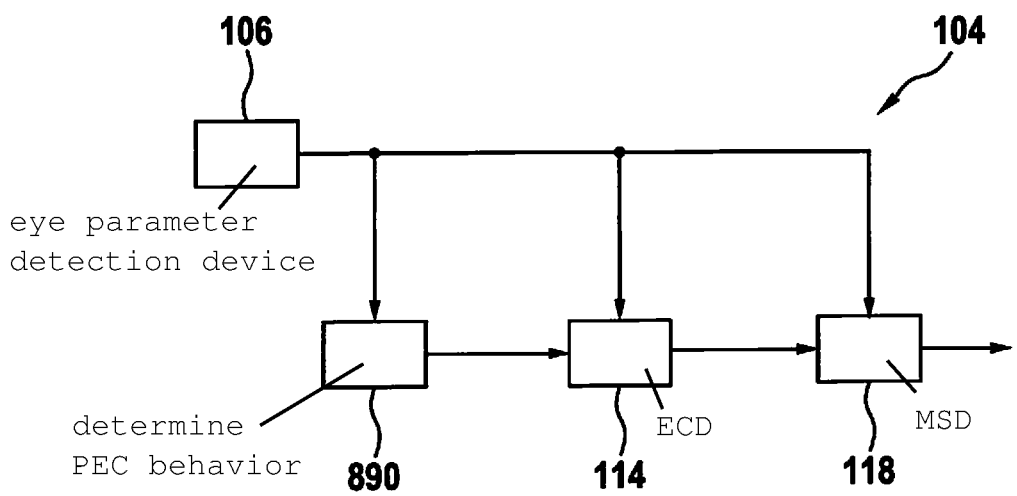
FIG. 8 is a block diagram of an apparatus in accordance with an exemplifying embodiment of the present invention.

FIG. 8 is a block diagram of an apparatus 104 in accordance with an exemplifying embodiment of the present invention. In the exemplifying embodiment depicted, apparatus 104 encompasses three blocks 890, 114, 118 that are connected to an eye parameter detection device 106.

Apparatus 104 can be referred to as a system for detecting microsleep from lid closure signals. Advantageously, apparatus 104 is embodied to recognize microsleep as an independent danger, and to furnish a timely warning. Advantageously, microsleep is recognized by apparatus 104, and the driver is awakened from his or her sleep with the aid of an assistance function. Advantageously, the risk or danger of an accident due to microsleep is prevented or decreased.

Block 106 represents a preprocessing in order to recognize closed eyes. This is also referred to as "eye closure preprocessing" (ECP). In this context, depending on the exemplifying embodiment the following variables, among others, are determined and corresponding signals or information items are furnished: instantaneous eye opening (=distance from upper eyelid to lower eyelid in [m]), speed $V_{eye}$ of eye opening [m/s], acceleration $a_{eye}$ of eye opening [m/s$^2$], and instantaneous eye opening level (=eye opening without taking blinking into account).

Block 890 represents a determination of a personal eye closure behavior (PEC), the personal eye opening limits of a driver being detected. For initialization, at the beginning of a journey the eye closure behavior of the driver can be observed for a short period (for example, two or five minutes). The maximum eye opening level is thus calculated, for example, by finding the maximum value of the eye closure signal at the beginning of the journey, and the minimum eye opening level is calculated, for example, by finding the minimum value of the eye closure signal at the beginning of the journey. As soon as a change in driver is recognized, the initialization is restarted. This can be recognized, for example, by identifying the driver from the camera image. Signals of the belt buckle or of the driver's door, and the speed signal, could also be taken into account, however.

In block 890, personal characteristics of the driver are identified. These depend on physiological features of the head and therefore remain constant as the journey proceeds. Concretely, those eye opening levels at which the eye can be characterized as 100% open and 0% are calculated. Optionally, a driver ID can be used, so that an identification of the driver can be made based on the video image. If the driver has been identified, previously stored values for the respective driver can optionally be retrieved and the identification step can be omitted.

Even if it can be assumed that a driver is alert at the beginning of a journey and that his or her eyes are 100% open, there can be cases in which a subsequent raising of the 100% level is useful (for example, driver is constantly squinting his or her eyes at the beginning of the journey, in particular due to external light conditions). This can be taken into account using a method that "learns" and adapts.

Block 890 is described by steps 772, 778, 789, 782 of the method described in FIG. 7. Interface 112, which represents some of the functions presented here, is depicted in FIG. 1.

In block 114, a detection takes place as to whether the driver's eyes are closed. This is referred to as "eyes closed detection" (ECD). An instantaneous percentage degree of opening can be calculated from the instantaneous degree of opening, eye opening level, or current eyelid position of the eyes, and from the personal level calculated in block 890. As soon as the instantaneous percentage degree of opening falls below a specific limit value (for example, 50%), the eyes are declared to be closed.

Optionally, in block 114 the gaze direction signal of an eye tracker is also used, or the availability of the gaze direction signal is monitored: as long as a gaze direction is recognized and available, the eyes are open. This method increases the classification quality.

Block 118 represents a microsleep detection (MSD). In a first exemplifying embodiment the closed-eyes duration is calculated, microsleep being detected as soon as the duration exceeds a specific limit value (for example, 1.5 s). This is also depicted by way of example in FIG. 3.

Alternatively or as a supplement, typical movement patterns in the context of microsleep are recognized so they can be recognized even before or during the occurrence of microsleep. This approach thus, generally, makes possible an earlier warning than with the exemplifying embodiment of microsleep detection described in the previous paragraph. Both the eye opening signal and other signals, for example the gaze direction, can be considered in this context. A variety of movement patterns are possible, e.g.: slow eye closure, detection of "fighting off sleep," or drifting pupils.

The following parameters are used in order to detect slow eye closure: eye opening level and eye opening speed. As soon as the speed signal is below or within a specific band (for example −0.1 m/s<current speed ($V_{eye}$)<−0.05 m/s) for a longer time period (for example, 0.5 second), microsleep can already be recognized at an early stage.

The following parameters are used in order to detect an effort to fight off sleep: eye opening level and eye opening speed. A state of "fighting off sleep" is recognized by recognizing frequent closing and opening of the eyes in combination with a slow eye opening speed. A corresponding signal is depicted by way of example in FIG. 5.

The following parameters are used in order to detect drifting pupils: eye opening level and gaze direction. Movement patterns of the gaze direction signal are used in order to detect drifting pupils. For better detection, they can also be used in conjunction with the instantaneous eye opening level. FIG. 6 shows an example of a horizontal profile of the gaze direction in a context of such pupil drifting.

Apparatus 104 is embodied to recognize single microsleep events. In an exemplifying embodiment, a microsleep event is recognized if the eyes are closed for longer than a predetermined time period, in which case microsleep or sleep exists.

In an exemplifying embodiment, early recognition of microsleep events is achieved. For example, the lid closure dynamics is used in order to recognize certain characteristic features of microsleep even as the eyes are closing. This method enables an earlier warning, associated with which is a greater gain in safety. In addition, various patterns are presented. Recognition is based on various variables (for example, eye closure speed).

It is advantageous to ascertain a fixed value of the eye opening level for each driver.

The exemplifying embodiments described and shown in the Figures are selected merely by way of example. Different exemplifying embodiments can be combined with one another completely or with reference to individual features. An exemplifying embodiment can also be supplemented with features of a further exemplifying embodiment.

In addition, the method steps presented here can be executed repeatedly and in a sequence other than the one described here.

If an exemplifying embodiment encompasses an "and/or" relationship between a first feature and a second feature, this is to be read to mean that the exemplifying embodiment according to one embodiment has both the first feature and the second feature, and according to a further embodiment has either only the first feature or only the second feature.

The invention claimed is:

1. A method for recognizing microsleep on the part of a driver of a vehicle, the method comprising:
   reading in an eye closure information item regarding an eye parameter of the driver, the eye closure information item representing at least one of a first eyelid position for a maximum eye opening level, and a second eyelid position for a minimum eye opening level, for the driver;
   classifying a current eyelid position of an eyelid of the driver using the eye closure information item to obtain an eye opening information item that represents an open state of the eyes or a closed state of the eyes; and
   ascertaining a risk potential value that represents a risk of an occurrence of the microsleep, the risk potential value being ascertained using at least one of the current eyelid position and the eye opening information item, the microsleep being recognized if the risk potential value during a predetermined time period exceeds a threshold value;
   wherein before the reading in, the driver is identified in an identifying task, and the eye closure information item is furnished from a database using an information item regarding the identified driver,
   wherein, in the ascertaining, the risk potential value is ascertained using lid closure dynamics and at least one of: (i) lid closure acceleration, and (ii) lid opening dynamics, and
   wherein, in the ascertaining, the risk potential value is ascertained using the lid closure dynamics and the at least one of: (i) the lid closure acceleration, and (ii) the lid opening dynamics, and wherein the lid closure dynamics and the at least one of: (i) the lid closure acceleration, and (ii) the lid opening dynamics is used to recognize characteristic features of the microsleep even as the eyes are closing.

2. A method for recognizing microsleep on the part of a driver of a vehicle, the method comprising:
   reading in an eye movement information item regarding an eye parameter of the driver, the eye movement information item representing an information item regarding an eye movement of the eyes of the driver; and
   ascertaining a risk potential value that represents risk of an occurrence of the microsleep, the risk potential value being ascertained using an eye opening speed derived from the eye movement information item and a gaze direction of the driver derived from the eye movement information item, the microsleep being recognized if the risk potential value during a predetermined time period exceeds a threshold value;
   wherein, in the ascertaining, the risk potential value is ascertained using lid closure dynamics and at least one of: (i) lid closure acceleration, and (ii) lid opening dynamics, and
   wherein, in the ascertaining, the risk potential value is ascertained using the lid closure dynamics and the at least one of: (i) the lid closure acceleration, and (ii) the lid opening dynamics, and wherein the lid closure dynamics and the at least one of: (i) the lid closure acceleration, and (ii) the lid opening dynamics is used to recognize characteristic features of the microsleep even as the eyes are closing.

3. The method as recited in claim 1, further comprising:
   reading in an eye movement information item regarding an eye parameter of the driver, the eye movement information item representing an information item regarding an eye movement of the eyes of the driver; and
   ascertaining a risk potential value that represents risk of an occurrence of the microsleep, the risk potential value being ascertained using at least one of an eye opening speed derived from the eye movement information item, and a gaze direction of the driver derived from the eye movement information item, the microsleep being recognized if the risk potential value during a predetermined time period exceeds a threshold value;
   wherein, in the ascertaining, the risk potential value is ascertained using the lid closure dynamics and the lid closure acceleration.

4. The method as recited in claim 1, wherein, before the reading-in, in an evaluating task, the current eyelid position is evaluated over an initialization time span to determine the eye closure information item.

5. The method as recited in claim 1, further comprising:
   performing a learning task, preceding the classifying, in which the eye closure information item is adapted using the current eyelid position.

6. The method as recited in claim 1, wherein, in the classifying, the eye opening information item is classified using a gaze direction signal to distinguish between open eyes and closed eyes.

7. The method as recited in claim 1, wherein, in the ascertaining, the risk potential value is ascertained using at least one of: (i) a number of eye opening information items, representing closed eyes, for the driver during the time period, and (ii) a duration of an eye opening information item, representing closed eyes, during the time period.

8. An apparatus for recognizing microsleep on the part of a driver of a vehicle, comprising:

a device configured to perform the following:
 read in an eye closure information item regarding an eye parameter of the driver, the eye closure information item representing at least one of a first eyelid position for a maximum eye opening level, and a second eyelid position for a minimum eye opening level, for the driver;
 classify a current eyelid position of an eyelid of the driver using the eye closure information item to obtain an eye opening information item that represents an open state of the eyes or a closed state of the eyes;
 ascertain a risk potential value that represents a risk of an occurrence of the microsleep, the risk potential value being ascertained using at least one of the current eyelid position and the eye opening information item, the microsleep being recognized if the risk potential value during a predetermined time period exceeds a threshold value; and
 before the reading in, identify the driver, the eye closure information item being furnished from a database using an information item regarding the identified driver;
 wherein, in the ascertaining, the risk potential value is ascertained using lid closure dynamics and at least one of: (i) lid closure acceleration, and (ii) lid opening dynamics, and
 wherein, in the ascertaining, the risk potential value is ascertained using the lid closure dynamics and the at least one of: (i) the lid closure acceleration, and (ii) the lid opening dynamics, and wherein the lid closure dynamics and the at least one of: (i) the lid closure acceleration, and (ii) the lid opening dynamics is used to recognize characteristic features of the microsleep even as the eyes are closing.

9. A non-transitory machine-readable memory medium on which is stored a computer program, which is executable by a computer, comprising:
 a program code arrangement having program code for recognizing microsleep on the part of a driver of a vehicle, by performing the following:
 reading in an eye closure information item regarding an eye parameter of the driver, the eye closure information item representing at least one of a first eyelid position for a maximum eye opening level, and a second eyelid position for a minimum eye opening level, for the driver;
 classifying a current eyelid position of an eyelid of the driver using the eye closure information item to obtain an eye opening information item that represents an open state of the eyes or a closed state of the eyes; and
 ascertaining a risk potential value that represents a risk of an occurrence of the microsleep, the risk potential value being ascertained using at least one of the current eyelid position and the eye opening information item, the microsleep being recognized if the risk potential value during a predetermined time period exceeds a threshold value;
 wherein before the reading in, the driver is identified in an identifying task, and the eye closure information item is furnished from a database using an information item regarding the identified driver,
 wherein, in the ascertaining, the risk potential value is ascertained using lid closure dynamics and at least one of: (i) lid closure acceleration, and (ii) lid opening dynamics, and
 wherein, in the ascertaining, the risk potential value is ascertained using the lid closure dynamics and the at least one of: (i) the lid closure acceleration, and (ii) the lid opening dynamics, and wherein the lid closure dynamics and the at least one of: (i) the lid closure acceleration, and (ii) the lid opening dynamics is used to recognize characteristic features of the microsleep even as the eyes are closing.

10. The non-transitory machine-readable memory medium as recited in claim 9, further comprising:
 reading in an eye movement information item regarding an eye parameter of the driver, the eye movement information item representing an information item regarding an eye movement of the eyes of the driver;
 wherein the risk potential value is further ascertained using an eye opening speed derived from the eye movement information item and a gaze direction of the driver derived from the eye movement information item, the microsleep being recognized if the risk potential value during a predetermined time period exceeds the threshold value, and
 wherein drifting pupils are detected using the eye opening level and the gaze direction, where movement patterns of a gaze direction signal are used to detect the drifting pupils.

11. The method as recited in claim 1, further comprising:
 reading in an eye movement information item regarding an eye parameter of the driver, the eye movement information item representing an information item regarding an eye movement of the eyes of the driver;
 wherein the risk potential value is further ascertained using an eye opening speed derived from the eye movement information item and a gaze direction of the driver derived from the eye movement information item, the microsleep being recognized if the risk potential value during a predetermined time period exceeds the threshold value, and
 wherein drifting pupils are detected using the eye opening level and the gaze direction, where movement patterns of a gaze direction signal are used to detect the drifting pupils.

12. The method as recited in claim 2, wherein drifting pupils are detected using the eye opening level and the gaze direction, where movement patterns of a gaze direction signal are used to detect the drifting pupils.

13. The apparatus as recited in claim 8, further comprising:
 reading in an eye movement information item regarding an eye parameter of the driver, the eye movement information item representing an information item regarding an eye movement of the eyes of the driver;
 wherein the risk potential value is further ascertained using an eye opening speed derived from the eye movement information item and a gaze direction of the driver derived from the eye movement information item, the microsleep being recognized if the risk potential value during a predetermined time period exceeds the threshold value, and
 wherein drifting pupils are detected using the eye opening level and the gaze direction, where movement patterns of a gaze direction signal are used to detect the drifting pupils.

* * * * *